United States Patent [19]

Kunkel et al.

[11] Patent Number: 4,871,620

[45] Date of Patent: Oct. 3, 1989

[54] TYPEWRITER RIBBON HAVING A THIN SUPPORT AND A TRANSFERABLE MASS, FOR TYPING ON VARIED SURFACES

[75] Inventors: Ernst Kunkel; Wolfhard Rutz, both of Hanover, Fed. Rep. of Germany

[73] Assignee: Pelikan Aktiengesellschaft, Hanover, Fed. Rep. of Germany

[21] Appl. No.: 201,375

[22] Filed: May 31, 1988

Related U.S. Application Data

[63] Continuation of Ser. No. 879,497, Jun. 24, 1986, abandoned, which is a continuation-in-part of Ser. No. 712,441, Mar. 18, 1985, abandoned.

[30] Foreign Application Priority Data

Mar. 17, 1984 [DE] Fed. Rep. of Germany ....... 3409936

[51] Int. Cl.[4] .................... B32B 9/04

[52] U.S. Cl. .................... 428/484; 106/20; 106/27; 106/28; 106/31; 260/DIG. 38; 400/341.1; 428/914; 428/488.1; 524/556

[58] Field of Search .................... 106/20, 27, 31, 28; 523/161; 260/DIG. 38; 524/210, 230, 556; 428/484, 488.1, 914; 400/241.1

[56] References Cited

U.S. PATENT DOCUMENTS

| | | | |
|---|---|---|---|
| 3,620,872 | 11/1971 | Backwell | 150/238 |
| 3,630,802 | 12/1971 | Dettling | 150/238 |
| 3,682,683 | 8/1972 | Elbert et al. | 117/36.1 |
| 3,776,864 | 12/1973 | Woerner | 260/17 |
| 3,825,437 | 7/1974 | Blair | 428/474.4 |
| 4,092,280 | 5/1978 | Barouh et al. | 523/161 |
| 4,427,739 | 1/1984 | Kohle et al. | 428/323 |
| 4,434,207 | 2/1984 | Franey | 427/208.4 |
| 4,515,489 | 5/1985 | Kohle et al. | 400/241.2 |
| 4,544,292 | 10/1985 | Kohle et al. | 400/241.2 |
| 4,592,945 | 6/1986 | Mecke et al. | 428/195 |
| 4,605,593 | 8/1986 | Iida | 428/352 |

FOREIGN PATENT DOCUMENTS

| | | |
|---|---|---|
| 1000583 | 2/1952 | France . |
| 2194570 | 4/1974 | France . |
| 420838 | 3/1967 | Switzerland . |
| 2098252 | 5/1982 | United Kingdom . |

OTHER PUBLICATIONS

U.S. patent application Ser. No. 06/878,747, filed Jun. 26, 1986, Norbert Mecke et al., "Thermal Transfer Ribbon and Method of Making Same".

U.S. patent application Ser. No. 06/868,434, filed May 30, 1986; Guenter Pietsch et al., "Fabric Printer Ribbon".

U.S. patent application Ser. No. 07/015,056, filed Feb. 3, 1987; Heinrich Krauter et al., "Method for fabricating Thermo-Inking Ribbons for Thermo-Transfer Printing, and Thermo-Inking Ribbon . . . ".

U.S. patent application Ser. No. 06/783,843, filed Oct. 3, 1985; Mecke et al.

Derwent Abstract, Accession No. 78-18797A/10, Japanese Patent No. 553009606-A.

Derwent Abstract, Accession No. 79-70132B/39, German Patent No. DE 2809658-A.

*Primary Examiner*—Amelia Burgess Yarbrough

*Attorney, Agent, or Firm*—Oblon, Spivak, McClelland, Maier & Neustadt

[57] ABSTRACT

The present invention relates to a typewriter ribbon made up of a flexible thin support and a transferable mass placed on the flexible thin support. The transferable mass comprises a surface-active dispersing agent and a surface-active resin dissolved in a medium-boiling solvent.

This ribbon is useful for correctable typing on delicate or treated paper, e.g., photocopied paper.

28 Claims, No Drawings

TYPEWRITER RIBBON HAVING A THIN SUPPORT AND A TRANSFERABLE MASS, FOR TYPING ON VARIED SURFACES

This application is a continuation of application Ser. No. 879,497, filed on June 24, 1986, now abandoned which is a continuation-in-part of application Ser. No. 712,441 filed Mar. 18, 1985, now abandoned.

BACKGROUND OF THE INVENTION

1. Field of the Invention

The invention relates to a typewriter ribbon comprising a flexible thin support and a transferable mass placed on the flexible thin support.

2. Description of the Prior Art

Ribbons of the type relating to the present invention are also known as "correctable" typewriter ribbons. These typewriter ribbons are made up of a film base and a thin colored film easily transferable by typing. The advantage of this completely transferable colored film is that the transferred markings, letters and characters, adhere rub-fastedly to the typing paper and can, when needed, be completely lifted by a more or less adhesive correction ribbon. With correctable ribbons it is possible to easily remove wrong or unintentionally typed letters and characters and to add the correct letter or character, or leave the space blank. These typewriter ribbons are mostly used in conjunction with correction ribbons in typing applications. A typewriter equipped with a suitable receiving device for spools and/or cassettes containing the typewriter ribbons and a key and device permitting easy correction, is used.

The first correctable typewriter ribbon was essentially described in DE-OS No. 2 335 838.

The transferable mass of the typewriter ribbon disclosed in DE-OS 2 335 838 contains (1) a film-forming resin, (2) liquid and/or waxy modifying agents incompatible with the resin, and (3) finely dispersed coloring agent. This composition is in the form of a heterogeneous mixture. The main component of the transferable mass is a film-forming resin which has a high degree of flexibility and is not easily friable or flaky. This film-forming resin peels off or crumbles like a wax. It has the advantage that it does not penetrate into the fibers of the typing paper surface and is contact-adhesive. It acts as a carrier, holding the agent or binder for the other components of the colored transferable mass. Typical film-forming resins which perform these functions are, for example, cellulose acetate butyrate, polyester resins, acrylic copolymers and polyamides Particularly a polyamide resin modified by diphenyl acid, and having a softening point of about 98° to 102° C., a viscosity of 2.6 to 3.4 $Ns/m^2$ at 160° C., an amine number of 5.2 mg KOH/g and an acid number of 2.5 mg KOH/g is used.

So that sharp character definition is obtained after key impact, it is necessary to make the film-forming resin sufficiently easily friable or brittle. This is achieved by lowering the tensile strength of the film formed by the film-forming resin after separation from a solvent. The solvents used are especially in the form of a solvent mixture of toluene and isopropanol having a relatively high toluene content.

An effort should also be made to avoid an excessive softening of the film-forming resin since softening of this resin lowers removability from the paper surface. Modifying agents, which are liquid and/or waxy by nature, are used to lower the tensile strength. Preferred modifying agents for lowering the tensile strength of the resin include mineral oils, which can be chosen within a relatively broad range of viscosities and properties to obtain the necessary degree of modification for each individual resin. Moreover, waxes in the broadest sense, especially synthetic waxes, can also be used. Waxes of this type include synthetic waxes with a base of partially saponified esters of montan wax acids.

Addition of synthetic waxes to the transferable mass has the effect of preventing oil migration to the colored surface or to the carrier if a sizable amount of mineral oil is used as the modifying agent.

Other components of the transferable mass can include softeners or plasticizers of the fatty acid ester type. For example, isopropyl palmitate and butyl stearate or a 2-ethylhexanol ester of a fatty acid mixture (stearic, palmitic and myristic acid) may be used.

Coloring agents which include both solvents or binder soluble and insoluble pigments are, of course, required. Carbon black is a preferred material for coloring.

The transferable mass described above is applied by a solvent coating method to a flexible thin support. The coated flexible thin support is then dried to produce a correctable typewriter ribbon. The flexible thin support is often a polyethylene film.

It has been shown in practice that transferable film typewriter ribbons do not always produce clearly legible, covering typing. Moreover, the type produced is not completely liftable and flawless. The type of impact element (ball element or printwheel), the force of the impact and the size of the font, the surface condition of the typing paper, all decisively affect the quality of the typing product and its correctability.

In particular, papers which have gone through a photocopier and are then to be typed on with a correctable ribbon are problematic in their ability to be typed on and corrected. The cause of this problem with copied paper is due to a change in the surface properties of the paper as a result of the photocopying process. During the process of electrophotographic copying a copy is made visible onto the paper with a coloring agent—also called a toner—from an image that is invisible at first and which is then fixed. Transfer of a fat-like substance occurs with the copying equipment of specific systems. This fat-like substance notably reduces the adhesion of the transferable film to the copied paper.

It is already known that to improve the properties of the heterogeneous mixture, water may be added to the dispersion of the transferable mass. The coating and drying of the transferable mass under specific climatic conditions is also known, but this is unfavorably expensive. Further, the improvements achieved so far are not at all satisfactory.

The typewriter ribbon disclosed in U.S. Pat. No. 3,682 683, which in its essential features corresponds to those described in DE-OS No. 2 335 838, does not solve the problems mentioned above. In particular the problem of typing on copied paper has not yet been solved.

Accordingly, there remains a strong need for a typewriter ribbon which produces intensive, easily readable type onto all kinds of paper, especially photocopied paper. Such a typewriter ribbon should also provide intensive, easily readable type which can be easily removed.

SUMMARY OF THE INVENTION

It is therefore an object of the present invention to provide a typewriter ribbon which produces an intensive, very readable type, onto all kinds of paper, e.g., photocopied paper.

It is another object of the present invention to provide a typewriter ribbon which produces an intensive, very readable type onto all kinds of paper, e.g., photocopied paper, where the type can be easily removed with an adhesive correction ribbon.

It is another object of this invention to provide a correctable typewriter ribbon requiring that no special technical precautions, e.g., complete or partial air-conditioning of the coating machine and of the necessary dry shaft be taken during production.

These objects have been surprisingly achieved with the present invention, which provides a transferable mass additionally containing at least one surface-active dispersing agent. This surface-active dispersing agent acts as an emulsifier in the liquid dispersion of the transferable mass originally applied to the support and is soluble in water, organic solvents and liquefied waxes. The transferable mass further contains at least one surface-active resin dissolved in a medium-boiling solvent.

Therefore, the present invention relates to the combination of at least two particularly surface-active substances and a medium-boiling solvent, and the incorporation of this combination into a transferable mass. The two different surface-active substances perform special functions in the production and use of the typewriter ribbon.

DESCRIPTION OF THE PREFERRED EMBODIMENTS

The present invention relates to a typewriter ribbon comprising a flexible thin support and transferable mass placed on the thin support. The transferable mass contains, in the form of a heterogeneous mixture, a film-forming rein, liquid and/or waxy modifying agents incompatible with the resin, and coloring agents finely dispersed therein. The transferable mass contains a surface-active dispersing agent, which acts as an emulsifier in the liquid dispersion of the transferable mass originally applied to the support. This surface-active dispersing agent is soluble in water, organic solvents and liquefied waxes, as well as in a surface-active resin dissolved in a medium-boiling solvent. This typewriter ribbon can be produced without observing special climatic conditions and makes possible trouble-free use of typing papers that have gone through an electrophotographic copier.

The surface-active dispersing agent to be used according to the present invention is an emulsifier in the broadest sense of the word. It is soluble in organic solvents and oils, or liquid or liquefied waxes of the dispersed system applied to the support of the typewriter ribbon.

For the purpose of the invention, the surface-active dispersing agents may be non-ionic and anionic emulsifiers of the so-called 0/W (oil/water) type having a base of epoxylated fatty alcohols, fats, fatty acids, alkylphenols and amino salts of fatty acid condensation products. These emulsifiers are generally used for emulsifying solvents, waxes, fats and fatty oils, paraffins and mineral oils, and for stabilizing other emulsions and dispersions.

Basically, of course, emulsifiers of other types can also be used, provided that they are suitable as dispersing agents for the purposes of the invention and meet the described solubility conditions.

Surface-active dispersing agents in the form of oxyalkylated esters of unsaturated higher fatty acids are preferred. Oxymethylated and/or oxyethylated esters are especially preferred. In this, case, a glyceride type ester is preferred. This ester can be a mono-, di- and tri-glyceride. The oxyalkylated forms of the esters which can be used in accordance with the invention are obtained, in particular, from esters of unsaturated higher fatty acids which can undergo an oxyalkylation, particularly an oxyethylation. Particularly useful fatty acids are oleic acid, elaidic acid, linoleic acid and ricinoleic acid. The oxyethylated glyceride of ricinoleic acid, which can be advantageously used in the form of ethoxylated castor oil is of particular value for the purposes of the present invention. Castor oil consists of 80 to 85% of the glyceride of ricinoleic acid, and in addition the glycerides of oleic (7%), linoleic (3%), palmitic (2%) and stearic (1%) acids. Ethoxylated castor oil is marked by a good solubility in fatty acids, polar solutions and water. The oxyethylated castor oil may be that produced commercially by BASF (trademark: Emulphor EL). This castor oil is a yellow oil, having a freezing point below +20° C., and which is soluble in fatty acids, waxes, castor oil, polar solvents (e.g., trichloroethylene, xylene) and water.

Because of its composition, the surface-active dispersing agent is able to improve the degree of distribution of the oily and waxy modifying agents in the dispersion. The dispersion and thus the film-forming resin take the form of a solution. The surface-active dispersing agent used in combination with the film-forming agent, which may be in particular a polyamide resin, improves dispersion of the modifying and coloring agents, particularly carbon black. Above all, by using the surface-active agent an undesirable agglomeration of the dispersed phase due to the presence of water in the solvents is avoided.

Since surface-active dispersing agents exhibit both hydrophilic and hydrophobic (lipophilic) characteristic, a particular balancing of these properties must be met on the basis of the solvent conditions used. In this connection, e.g., the extent of the oxyalkylation can be determining. It is known to one skilled in the art that hydrophilic groups introduced by oxyalkylation can also be replaced by other hydrophilic groups, e.g., such as by sulfation.

In accordance with the invention, a minimal amount of surface-active dispersing agent is used in the transferable mass applied to the typewriter ribbon. The desired effects of the present invention are obtained in a particularly favorable way, if these dispersing agents are present in the transferable mass in an amount of 0.01 to 0.2% by weight, relative to the dry substance. In a preferred embodiment 0.01 to 0.1% by weight is used. A value of about 0.07% by weight is very particularly preferred. The minimum value of 0.01% by weight should not be gone under, while the maximum value of 0.2% by weight can be exceeded slightly. However, in exceeding the maximum value, it should be realized that too great of a quantity of dispersing agent can result in that the surface-active dispersing agent performs the function of a plasticizer and consequently an undesired adhesiveness is imparted to the transferable film so that lift-off with a correction ribbon is made more difficult. It is, of course, to be understood that mixtures of more than one surface-active dispersing agent may be used.

The present invention requires in addition to the above described surface-active dispersing agent, a particular surface-active resin, together with a medium-boiling solvent. The surface-active resin and the medium boiling solvent perform the function of leveling agent during the application of the liquid dispersion of the transferable mass onto the support. Such leveling agents are known in paint technology and perform the same function there as they do in the present invention. The leveling agent promotes the formation of smooth, even coatings of the transferable films. The transferable film, right after application, can often be uneven, rough or structured. The leveling agent also prevents uncontrolled agglomeration during drying.

The particular kind of leveling agent to be used depends on the film-forming resin used in each case. In particular, oligomer resins and resinous materials with surface activity can be used as the leveling agent. At the film-forming temperature these resins probably also additionally act as plasticizers for the other resin component. The resins used must be in part hydrophilic. This hydrophilicity may be introduced by modification of the resin, which can particularly be an acrylic resin. For example, a hydroxyethyl group can be introduced using the so-called oxyethylation reaction. Alternatively a group can be introduced by sulfation. By this method, the surface-active character of the resin is adjusted. Additionally, the extensive solubility required in the initial system comprising the transferable means in combination with the medium-boiling solvent is obtained.

Specific examples of acrylic resins usable in this invention are given below for purposes of illustration. The present invention is obviously not limited to these examples (1) "SEPARAN AP 273®" (trademark of Dow Chemical Co.) can be used. This is ashynthetic, anionic, organic flocculant with a molecular weight of about 4–6 million. It is primarily used in water and wastewater treatment in the chemical industry, in sugar manufacturing, and in mining.

| Characteristics | |
|---|---|
| Chemical nature | a polyacrylamide |
| Electrochemical character | anionic |
| Appearance | White powder, with good pourability |
| Particle size | 95% with diameter <1 mm |
| Apparent density (bulk) | c. 0.70 g/cc |
| pH of a 25% solution | c. 10 |
| Solubility, theoretical | Infinite (any proportion) |
| Solubility, practical | 0.5% max. concentration<br>0.25% recommended concentration for stock solutions |

(2) "Joncryl 77®" manufactured by Johnson Wax can also be used. "Joncryl 77®" is a styrene/acrylic polymer commercially available as an emulsion. It is primarily used in water-thinnable flexographic and photogravure inks and overprinting lakes.

| Typical Specifications | |
|---|---|
| Outward appearance | Irregular white liquid |
| Non-volatiles | 45% |
| Molecular weight (Mw) | >200,000 |
| pH | 8.3 |
| Acid number | 55 |
| Density at 25° C. | 1.04 g/cc |
| MFT (minimum fluidity temperature) | 20° C. |
| Tg (glass transition temperature) | 21° C. |
| Freezing stability | Yes |

(3) Propiofane 540 D can be used. Propiofane 540 D is a medium-viscosity, mixed-disperse dispersion of a vinyl propanoate/acrylate copolymer, having good flow properties and high pigment binding capability. Propiolan 540 D is manufactured by BASF. It is used in films which are light-resistant, impact-elastic, waterproof, and alkali-resistant.

Propiofane 540 D is primarily applied to a wide variety of interior and exterior substrates It has good flow characteristics when applied, and good gloss. It is also used in plasters and plastic compositions, and as a binder for full-shade and tinting pigments or the like.

Characteristic parameters:

| Characteristic parameters: |
|---|
| (a) nonvolatiles = c. 50% |
| (b) MFT (according to DIN 53787) = c. 7° C. |
| (c) density of the dispersion = c. 1.02 g/cc |
| (d) density of the polymer (according to DIN 53479) = c. 1.10 g/cc. |

The above-illustrated acrylate polymers suggest that the acrylate component is the essential factor of the acrylic resin used in this invention The modifying comonomer is not particularly relevant. Thus, for example, as shown above, styrene or even vinyl propionate can be copolymerized with acrylic acid or a derivative thereof, and the resulting copolymer can be used in the present invention. In addition to vinyl propanoate which is a suitable comonomer, other copolymerizable carbonic acids and carbonates can be used, e.g. maleic acid, fumaric acid, maleic acid or tumric acid substituted on the olefinic functionality by one or two methyl or ethyl groups, etc.

A modified surface-active resin paint additive produced and marketed under the designation FCLA-WR (Paint Chemicals Inc., Chicago, Ill. USA) is particularly preferred for the purposes of the present invention. FCLA-WR is a surface active modified acrylic resin dissolved mainly in 2-ethoxyethanol (ethylene glycol monoethyl ether). It can be added to virtually all water-thinnable paints. It has a specific weight of about 0.93, a viscosity of 15 to 25 mPa·s, a flash point over 40° C. and is slightly yellowish of color. It is, of course, to be understood that mixtures of more than one modified surface-active resin may be used.

While water need not be present in the transferable mass of the present invention, the surface-active dispersing agent and the surface-active resin must be characterized by being soluble in water, organic solvents as well as liquefied waxes.

Like the two surface-active substances described, the medium-boiling solvent is of essential importance for the purposes of the invention. This solvent is an organic solvent having polar characteristics, and which solvates the surface-active resin. This solvent must also be soluble in the liquid dispersion of the transferable mass which is first applied to the thin flexible support of the typewriter ribbon and then dried.

The boiling range of a suitable "medium-boiling" solvent should not be taken too narrowly. Suitable solvents are organic solvents whose boiling point temperature is roughly between about 100° C. and 200° C., preferably between 120° C. and 170° C. Preferred solvents may be medium-boiling alcohols, such as cyclohexanol, butyl glycol and particularly alkoxy alcohols such as 2-ethoxyethanol, 2-methoxyethanol, 2-propoxyethanol and 2-butoxyethanol. Of these, 2-ethoxyethanol is most preferred, and of course mixtures of the solvents can be used. The alkoxy group of the alkoxy alcohols must not be too long since this would lower their required water solubility too much, and thus the alkoxy alcohol could no longer act as the required solvent in the total system in accordance with the present invention.

The solvent forms the main component in the leveling agent made up of solvent and surface-active resin. The resin component should amount to about 3% by weight or less, particularly about 1.5% by weight. It is preferable for the resin component to amount to about 1 to 5% by weight. Such a mixture can be present in the transferable mass in an amount of about 2 to 10% by weight, in relation to dry substance. In this connection, the portion of the modified surface-active resin is not included in the concept "dry substance." The weight percentage range of 2 to 10% by weight, especially the lower limit, should be observed as much as possible. That is to say, if the value is below 2% by weight, the effects sought no longer occur to the extent desired. The value of 10% by weight can be exceeded slightly, however, no notable improvement is achieved by exceeding 10% by weight. Rather, negative effects begin to come into play. In particular, drying difficulties occur because of the high portion of solvent component present. Therefore, to the extent possible, the range of about 1.5 to 12% by weight should not be gone under or over.

The function of either the surface-active dispersing agent or the surface-active resin does not depend on the type of polymer used in the film-forming resin. The film-forming resins may be, for example, polyester resins, acrylic copolymers, polyamides or cellulose acetate butyrate. Examples of polyester resins which may be used are poly(ethylene terephthalate), poly(butylene terephthalate), a polyester based on the combination of poly(tetramethylene glycol) and 1,4-butane diol with dimethylterephthalate, poly(alkylene terephthalates) or Kadar PETG 6763 which is a modified poly(ethylene-coterephthalate) resin. Examples of acrylic copolymers which may be used are: copolymers of acrylic acid with vinyl aromatic monomers or other ethylenically unsaturated monomers. Such acrylic copolymers are well known in the art. Examples of polyamide resins which may be used are: nylon-6, nylon-6,6, nylon-7, nylon-12, nylon 6,o-methyl-6, nylon-6, α-ethyl-6, nylon-6,α-n-butyl-6, nylon-6,α-benzyl-6, nylon-6,α,α'-dimethyl-6 and nylon-6,α,α,α'α'-tetramethyl-6. A polyamide resin modified by diphenyl acid, and having a softening point of about 98° to 102° C., a viscosity of 2.6 to 3.4 $Ns/m^2$ at 160° C., an amine number of 5.2 mg KOH/g and an acid number of 2.5 mg KOH/g may be used.

Normally no water need to be in the transferable mass. However the presence of water in transferable mass is acceptable and the maximum water content which can be tolerated depends on the special kind of medium-boiling solvent used. These solvents are unlimitedly miscible with water and prevent agglomeration.

With the explicit understanding that the present invention will not be construed as being limited thereby, the invention may be explained theoretically as follows. The medium boiling solvent accumulates on the surface during evaporation of the liquid component of the transferable mass. Because of its good solvation power for the oily and waxy modifying agents in the transferable mass and because of its unlimited miscibility with water, the medium-boiling solvent prevents a premature agglomeration of the dispersed system and in this way improves film formation. The highly active mixture of the medium-boiling solvent and the modified surface-active resin also makes possible the high quality coating of a typewriter ribbon with the transferable mass under inconstant climatic conditions. Further, the adhesion of the transferable mass to sensitive paper is improved. In particular, those papers having gone through an electrophotographic copier and onto which a fat-like substance was transferred.

Other features of the present invention will become apparent in the course of the following description of exemplary embodiments which are given for purposes of illustration of the invention and are not intended to be limiting thereof.

EXAMPLE

A mixture of 30 parts by weight of polyamide resin, 25 parts by weight of mineral oil (white oil), 20 parts by weight of plasticizer and 30 parts by weight of carbon black is produced as follows. The polyamide resin used is a phenolic-modified polyamide resin produced commercially by the Societe Francaise d'Organosynthese (Trademark: Scope 30). The softening point of this polyamide is 99°-105° C., its Gardner viscosity of a 50% solution in isopropanol is I-L, its Gardner color number is less than 8 (50% solution in isopropanol), and its acid number is less than 4. The mineral oil (white oil) is a refined mineral oil which may be used as a lubricating oil as well as for cosmetic compositions. It is also referred to as "paraffinum liquidum." It may be, the oil identified by the American Pharmacopoeia USP XVII as being paraffinum liquidum which is a mineral oil without color, taste or odor, and having a density of 0.860 to 0.905 at 25 percent, and a viscosity of 38.1 Cst. This oil is identified as "heavy liquid petrolatum" according to USP XVII. In this example the mineral oil used has a viscosity of 230 Cst (20° C.), a flash-point of 210° C., a pour point of −21° C., a density of 0.885 and a refraction index of 1.482. The polyamide is dissolved in a solvent mixture of about 5/6 isopropanol and 1/6 toluene. The proportion of the mixture used in producing the resin solution amounts to about 10 parts by weight of solvent mixture to 3 parts by weight of polyamide resin. After complete dissolution of the resin, 1 part of carbon black and 1 part of isopropanol ar added to every 3 parts of polyamide resin solution. The mixture is then ground for about 9 hours to disperse the carbon black finely in the resin solution, and then filtered. A solvent mixture with a solvent ratio of 3.4 parts of isopropanol to 1 part of toluene is produced. 1 part of plasticizer and 1.25 parts of mineral oil are added to 5 parts of the above solvent mixture. A thorough mixing follows. 7.5 parts of the above dispersion and 11.5 parts of the solvent mixture are added to this mixture with stirring. Further, 0.05 part of oxyethylated castor oil and 4 parts by weight of a 15% solution of a modified surface-active acrylic resin in 2-ethoxyethanol are added thereto. (The oxyethylated castor oil is Emulphor EL (BASF), described supra. The surface-active resin used is FCLA-WR, described supra.) The resulting mixture is again stirred thoroughly. The mixture now resulting is applied in film form to a thin flexible polyethylene film with a coating weight of about 2–3 g/$m^2$. Drying at 50°–60° C. follows with the formation of a solid film of the transferable mass.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A typewriter ribbon comprising (a) a thin support and (2) a transferable mass, wherein said transferable mass consists essentially of a film-forming resin, a wax, at least one finely dispersed coloring agent, and (2.1) a surface active dispersing agent which is at least one member selected from the group consisting of a base of an oxyalkylated fatty alcohol, an unsaturated oxyalkylated fatty acid, an oxyalkylated ester of an unsaturated fatty acid, a fat, a fatty acid, an alkylphenol, and an amino salt of a fatty acid condensation product, and (2.2) a surface-active resin dissolved in a medium-boiling alcohol solvent, said surface-active resin being at least one member selected from the group consisting of a polyacrylamide, a styrene/acrylic copolymer, a vinyl propanoate/acrylate copolymer, and a surface active modified acrylic resin.

2. A typewriter ribbon comprising (1) a thin support and (2) a transferable mass, wherein said transferable mass consists essentially of a film-forming resin, a wax, at least one finely dispersed coloring agent, and:

(2.1) a surface active dispersing agent which is at least one member selected from the group consisting of a base of an oxyalkylated fatty alcohol, an unsaturated oxyalkylated fatty acid, an oxyalkylated ester of an unsaturated fatty acid, a fat, or a fatty acid, an alkylphenol, and an amino salt of a fatty acid condensation product, and (2.2) a surface-active resin dissolved in a medium-boiling alcohol solvent, said surface-active resin being at least one member selected from the group consisting of a polyacrylamide, a styrene-acrylic copolymer, a vinyl propanoate/acrylate copolymer, a maleic acid/acrylic acid copolymer, a fumaric acid/acrylic acid copolymer, a $C_{1-2}$ substituted maleic acid/acrylic acid copolymer and a $C_{1-2}$ substituted numeric acid/acrylic copolymer.

3. The typewriter ribbon of claim 1, wherein the transferable mass comprises a film-forming resin and at least one finely dispersed coloring agent.

4. The typewriter ribbon of claim 2, wherein the transferable mass comprises a film-forming resin in at least one finely dispersed coloring agent.

5. The typewriter ribbon of claim 1, wherein the surface-active dispersing agent comprises a non-ionic and an anionic emulsifier.

6. The typewriter ribbon of claim 2, wherein the surface-active dispersing agent comprises a non-ionic and an anionic emulsifier.

7. The typewriter ribbon of claim 1, wherein the surface-active resin comprises a surface active modified acrylic resin dissolved in 2-ethoxyethanol.

8. The typewriter ribbon of claim 1, wherein the surface-active dispersing agent acts as an emulsifier in the liquid dispersion of the transferable mass.

9. The typewriter ribbon of claim 2, wherein the surface-active dispersing acts as an emulsifier in the liquid dispersion of the transferable mass.

10. The typewriter ribbon of claim 1, wherein the solvent has a boiling point temperature, within the range of about 100° to 200° C.

11. The typewriter ribbon of claim 2, wherein the solvent has a boiling point temperature within the range of about 100° to 200° C.

12. The typewriter ribbon of claim 1, wherein the surface-active dispersing agent is an oxyalkylated ester of an unsaturated higher fatty acid.

13. The typewriter ribbon of claim 12, wherein the ester is oxymethylated or oxyethylated.

14. The typewriter ribbon of claim 12, wherein the ester is a glyceride or the surface active dispersing agent is an epoxylated fatty alcohol.

15. The typewriter ribbon of claim 12, wherein the ester is an oxyethylated glyceride of ricinoleic acid.

16. The typewriter ribbon of claim 15, wherein the ester is oxyethylated castor oil.

17. The typewriter ribbon of claim 1, comprising the surface-active modified acrylic resin dissolved in a medium-boiling alcohol.

18. The typewriter ribbon of claim 17, wherein the medium boiling alcohol is at least one member selected from the group consisting of cyclohexanol, butyl glycol, 2-ethoxyethanol, 2-methoxyethanol, 2-pyropoxyethanol and 2-butoxyethanol.

19. The typewriter ribbon of claim 18, wherein the alcohol is 2-ethoxyethanol.

20. The typewriter ribbon of claim 1, wherein the surface-active dispersing agent is contained in the transferable mass in an amount of from 0.01 to 0.2% by weight in relation to dry substance.

21. The typewriter ribbon of claim 1, wherein a solution of the surface-active resin is contained in the transferable mass in an amount of from 2 to 10% by weight in relation to dry substance.

22. The typewriter ribbon of claim 18, wherein the solution comprises about 90% by weight of solvent.

23. The typewriter ribbon of claim 1, wherein said film-forming resin is modified with an amount of a viscosity modifying agent suitable to permit a sharp transfer of said resin.

24. The typewriter ribbon of claim 2, wherein said film-forming resin is modified with an amount of a viscosity modifying agent suitable to permit a sharp transfer of said resin.

25. The typewriter ribbon of claim 20, wherein said film-forming resin is modified with a liquid viscosity modifier.

26. The typewriter ribbon of claim 20 wherein said film-forming resin is modified with a wax.

27. The typewriter ribbon of claim 2, wherein a solution of the surface-active resin is contained in the transferable mass in an amount of from 2 to 10% by weight in relation to dry substance.

28. The typewriter ribbon of claim 2, wherein the surfce-active dispersing agent is contained in the transferable mass in an amount of from 0.01 to 0.2% by weight in relation to dry substance.

* * * * *